United States Patent
Nicoara et al.

(10) Patent No.: US 11,665,258 B2
(45) Date of Patent: May 30, 2023

(54) SEAMLESS CONNECTIVITY BETWEEN NETWORK FUNCTIONS DEPLOYED ON EDGE AND IN THE CLOUD

(71) Applicant: Cisco Technology, Inc., San Jose, CA (US)

(72) Inventors: Eugen Octavian Nicoara, Highlands Ranch, CO (US); Shyam Sundar Ramamoorthy, Denver, CO (US); Seshagiri Rao Kasa, Centennial, CO (US); Niraj R. Londhe, Littleton, CO (US); Chase Wolfinger, Littleton, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/542,028

(22) Filed: Dec. 3, 2021

(65) Prior Publication Data
US 2023/0073863 A1  Mar. 9, 2023

Related U.S. Application Data

(60) Provisional application No. 63/240,415, filed on Sep. 3, 2021.

(51) Int. Cl.
*H04L 67/566* (2022.01)
(52) U.S. Cl.
CPC .................................. *H04L 67/566* (2022.05)
(58) Field of Classification Search
None
See application file for complete search history.

(56) References Cited

U.S. PATENT DOCUMENTS 9,935,955 B2  4/2018 Desai et al.
10,609,042 B2  3/2020 Quinn et al.
(Continued)

FOREIGN PATENT DOCUMENTS

CN  112448858 B  4/2021

OTHER PUBLICATIONS

3GPP, "3rd Generation Partnership Project; Technical Specification Group Services and System Aspects; System architecture for the 5G System (5GS); Stage 2 (Release 17)," 3GPP TS 23.501 V17.1.1 (Jun. 2021), Technical Specification, Jun. 2021, 526 pages.
(Continued)

*Primary Examiner* — Ranodhi Serrao
(74) *Attorney, Agent, or Firm* — Edell, Shapiro & Finnan, LLC

(57) ABSTRACT

Methods are provided for a first proxy service obtaining a request originating from a source network function for a destination network function. These functions are each one of a cloud network function deployed in a cloud network and an edge network function deployed in an on-premises network. The methods further involve providing the request to the destination network function when the request is received from a second proxy service or to the second proxy service when the request is received from the source network function such that the second proxy service provides the request to the destination network function. The first proxy service and the second proxy service are each one of a cloud proxy service deployed in the cloud and configured to communicate with the cloud network function and an edge proxy service deployed at the edge and configured to communicate with the edge network function.

20 Claims, 11 Drawing Sheets

(56) References Cited

U.S. PATENT DOCUMENTS

| | | | |
|---|---|---|---|
| 10,848,524 B2* | 11/2020 | Maino | H04L 63/205 |
| 10,887,276 B1* | 1/2021 | Parulkar | H04L 61/4511 |
| 10,959,098 B2* | 3/2021 | Cidon | H04L 41/12 |
| 11,003,639 B2* | 5/2021 | Wang | H04L 67/1097 |
| 11,044,326 B2* | 6/2021 | Madden | H04L 12/4633 |
| 11,057,350 B2 | 7/2021 | Janakiraman et al. | |
| 11,075,884 B2* | 7/2021 | Feng | H04L 63/0263 |
| 11,088,948 B1* | 8/2021 | Talur | H04L 45/38 |
| 2012/0155389 A1* | 6/2012 | McNamee | H04L 65/80 |
| | | | 370/328 |
| 2020/0036754 A1* | 1/2020 | Livanos | H04W 48/16 |
| 2020/0252376 A1* | 8/2020 | Feng | H04L 63/0263 |
| 2020/0382615 A1* | 12/2020 | Lifshitz | H04L 12/4633 |
| 2021/0014285 A1* | 1/2021 | Maino | H04L 63/0428 |
| 2021/0144517 A1 | 5/2021 | Guim Bernat et al. | |
| 2021/0314411 A1* | 10/2021 | Madden | H04L 67/2871 |

OTHER PUBLICATIONS

Srivastava, et al., "Proxy Edge Function for Cloud Based 5G Core," Technical Disclosure Commons, https://www.tdcommons.org/dpubs_series/3579, Sep. 2020, 5 pages.

\* cited by examiner

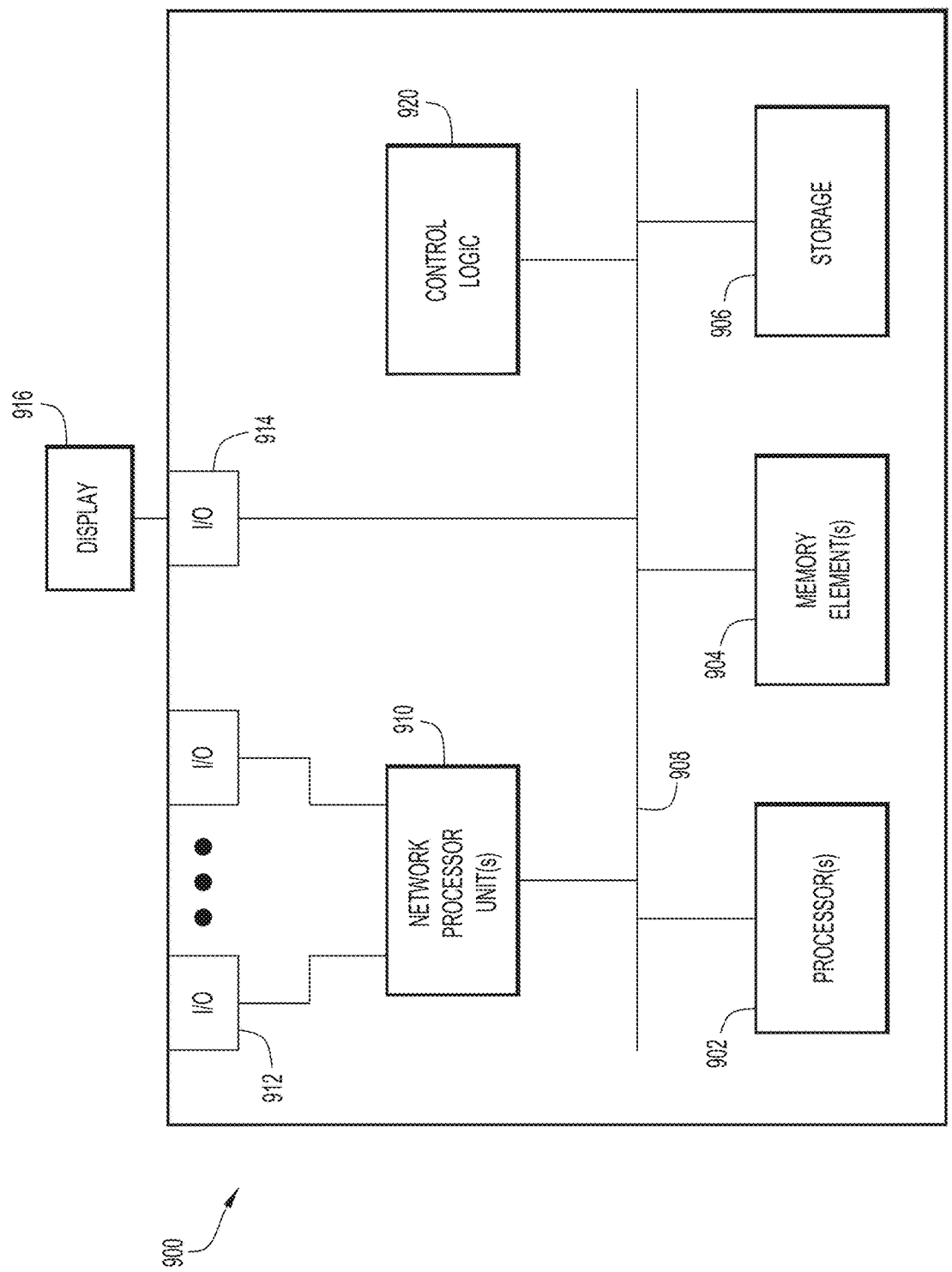

SEAMLESS CONNECTIVITY BETWEEN NETWORK FUNCTIONS DEPLOYED ON EDGE AND IN THE CLOUD

CROSS REFERENCE TO RELATED APPLICATION

This application claims priority to U.S. Provisional Application No. 63/240,415, filed Sep. 3, 2021, the entirety of which is incorporated herein by reference.

TECHNICAL FIELD

The present disclosure relates to computer networking.

BACKGROUND

Mobile communication networks provide data and voice services to their subscribers. A subscriber registers with a mobile communication network to establish a connection with the mobile communication network. The mobile network operators (MNOs) provide voice and data services to user equipment (UEs) using various network connectivity services such as a fifth generation (5G) network or a fourth generation (4G) network. Some of these connectivity providing services offered by the MNOs may be segmented for various enterprises, for example, to provide enterprise specific network slices. Segmented services may be services offered by various third parties such as applications and/or enterprise domains. Access to various enterprise services is enabled through these network slices provided or hosted by the MNO, also sometimes referred to as a service provider (SP) or MNO/SP.

BRIEF DESCRIPTION OF THE DRAWINGS

FIG. 9 is a hardware block diagram of a computing device that may perform functions associated with any combination of operations in connection with the techniques depicted and described in FIGS. 1-8, according to various example embodiments.

DESCRIPTION OF EXAMPLE EMBODIMENTS

Overview

Figure 1:
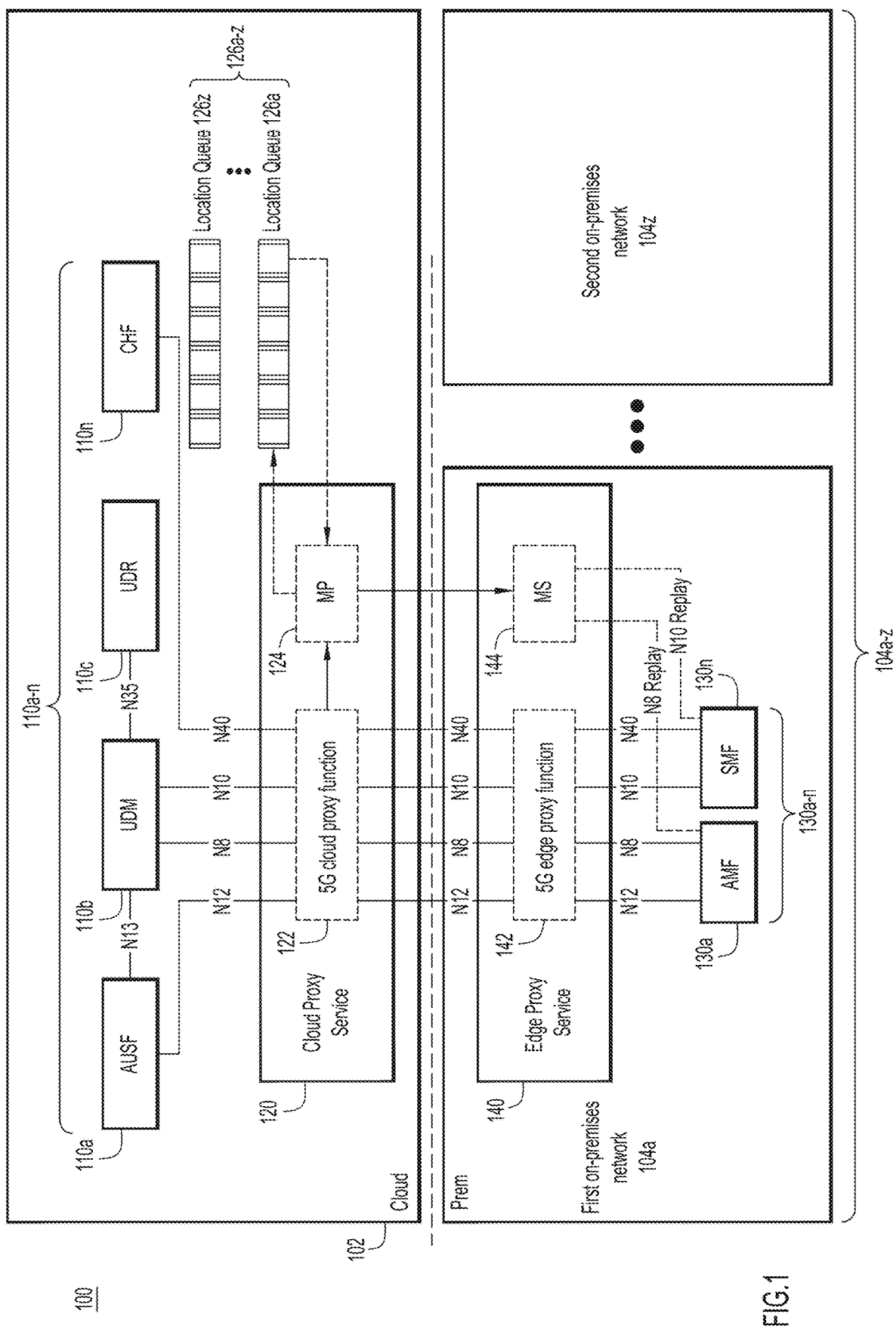
FIG. 1 is a block diagram illustrating 5G architecture in which a pair of proxies provides seamless connectivity between network functions deployed in one or more on-premises networks and in a cloud network, according to an example embodiment.

Briefly, methods are presented for providing seamless connectivity between network functions of a service being deployed in an on-premises network and in a cloud network.

In these methods, a first proxy service obtains a request originating from a source network function for a destination network function wherein the source network function and the destination network function are each one of a cloud network function deployed in a cloud network and an edge network function deployed in an on-premises network. These methods further involve providing, by the first proxy service, the request to the destination network function based on the request being received by the first proxy service from a second proxy service or the second proxy service based on the request being received by the first proxy service from the source network function such that the second proxy service provides the request to the destination network function. The first proxy service and the second proxy service are each one of a cloud proxy service deployed in the cloud network and configured to communicate with the cloud network function and an edge proxy service deployed in the on-premises network and configured to communicate with the edge network function.

Example Embodiments

Mobile network operators (MNOs) provide connectivity service to the UEs using various wired and/or wireless cellular networks which may include but are not limited to 3rd Generation Partnership Project (3GPP) fourth generation (4G)/Long Term Evolution (LTE) network and fifth generation (5G) cellular network. Network connectivity services may be split into various network functions (NFs), some of which are hosted in a cloud network or in a cloud (network as a service). In particular, in providing network connectivity to the UEs, some NFs are hosted in the cloud network while other NFs are hosted by an on-premises network (sometimes referred to as an "edge"). That is, a connectivity providing service is established using a plurality of network functions that include the source network function and the destination network function.

In the context of 4G and/or 5G system architectures, any NF may initiate a request towards another NF if there is a reference point defined between the two NFs. In the context of 5G as a service (5GaaS), for example, only the NFs deployed at an edge or in the on-premises network may initiate requests towards the NFs deployed in the cloud network (provider network). For security reasons, the NFs deployed at the edge or in the on-premises network do not expose application programming interface (API) endpoints, so the NFs deployed in the cloud network cannot initiate requests towards the NFs deployed at the edge. To allow for the communication between the NFs deployed at the edge, a tunnel is typically established and maintained, which is cumbersome and inefficient. Further, Internet Security (IPSec)-based solutions (security solutions) that involve reconfiguration of firewall and/or security policies are also cumbersome, are subject to security issues, and possible attacks due to open firewall ports.

The techniques presented herein provide a proxy service that route data or traffic between the NFs deployed at an edge of the on-premises network (edge NFs) and the NFs deployed in a cloud network (cloud NFs) of a network connectivity service. A pull-push API defined by 3GPP standard is replaced with a pull-pull API using Hypertext Transfer Protocol (HTTP) (e.g., using the HTTP/1.1 instead of HTTP/2 in this example; the techniques are not limited to HTTP/1.1 and HTTP/2 may be used in another example) for communication between the edge NFs and the cloud NFs of the connectivity providing service such as 4G or 5G networks (4G/5GaaS). The techniques presented herein maintain security and do not involve establishing a tunnel. The techniques presented herein require few to no changes in network designs and configurations of the 4G/5GaaS. As such, a connectivity providing service is established using a plurality of network functions deployed in a cloud and on-premises network that use a pair of proxies for seamless connectivity.

The pair of proxies involves an edge proxy and a cloud proxy that route traffic between the edge NFs and the cloud NFs. The edge proxy proxies requests from the edge NFs to the cloud proxy and relays the responses. The edge proxy also periodically polls the cloud proxy for new requests and submits the requests to the edge NFs. The cloud proxy proxies the requests from the edge proxy to the cloud NFs and relays responses back. The cloud proxy also dispatches the requests to the destination cloud NFs. The cloud proxy also receives requests from the cloud NFs, places these requests into location-based queues, and extracts requests from these location-based queues for delivery when polled by the edge proxy.

FIG. 1 is a block diagram illustrating a 5G architecture 100 in which a pair of proxies provides seamless connectivity between NFs deployed at an edge of one or more on-premises networks and in a cloud network, according to an example embodiment. A connectivity providing service is established using these NFs.

The 5G architecture 100 includes a cloud network 102 (cloud) and on-premises networks 104a-z such as a first on-premises network 104a and a second on-premises network 104z. The cloud network 102 hosts some of the NFs of the connectivity providing service such as data repositories and subscriber databases. The on-premises networks 104a-z are enterprise networks or network domains at particular locations. That is, a plurality of on-premises networks 104a-z connect to the cloud network 102.

The notations 1, 2, 3, . . . . n; a, b, c, . . . z; and a, b, c, . . . n illustrate that the number of elements can vary depending on a particular implementation or deployment and is not limited to the number of elements being depicted or described.

The cloud network 102 includes cloud NFs 110a-n and a cloud proxy service 120. The cloud NFs 110a-n may include but are not limited to an Authentication Server Function (AUSF) 110a responsible for authenticating subscribers, a Unified Data Management (UDM) 110b responsible for authentication credentials generation and subscription identification handling, a Unified Data Repository (UDR) 110c that stores subscription related information and/or policies, and a charging function (CHF) 110n responsible for charging and/or billing subscribers for services provided by the MNO or for the provided connectivity service.

The cloud proxy service 120 includes a 5G cloud proxy function 122, a message publisher (MP) 124, and location queues 126a-z (location-based queues such as a first location queue 126a and a second location queue 126z). In an example non-limiting embodiment, there is one location queue for each on-premises network. The cloud proxy service 120, via the 5G cloud proxy function 122, communicates with the on-premises networks 104a-z to provide edge-initiated requests to the cloud NFs 110a-n and to provide cloud-initiated requests from the cloud NFs 110a-n to the on-premises networks 104a-z. The edge-initiated requests are requests originating from the on-premises networks 104a-z. A source network function of the edge-initiated requests is an edge network function, and the destination network function of the edge-initiated requests is a cloud network function. Cloud-initiated requests are requests originating from the cloud network 102. The source network function of the cloud-initiated requests is the cloud network function, and the destination network function of the cloud-initiated requests is the edge network function.

Each on-premises network includes various NFs that communicate with a respective edge proxy deployed at an edge of the respective on-premises network. By way of an example, the first on-premises network 104a includes edge NFs 130a-n and an edge proxy service 140.

The edge NFs 130a-n may include but are not limited to Access and Mobility Management Function (AMF) 130a and a Session Management Function (SMF) 130n. Generally, the AMF 130a is responsible for handling connections and mobility management tasks. The SMF 130n is responsible for handling session management. The SMF 130n interacts with a decoupled data plane, creating, updating, and removing Protocol Data Unit (PDU) sessions, and managing session context with one or more User Plane Functions (UPFs) (not shown).

The edge proxy service 140 includes a 5G edge proxy function 142 and a consumer or a message subscriber (MS) 144. For edge-initiated requests, the 5G edge proxy function 142 proxies the requests from the edge NFs 130a-n to the cloud proxy service 120, via the 5G cloud proxy function (122), and relays responses back to a respective edge NF. For cloud-initiated requests, the MS 144 periodically polls the cloud network 102 (e.g., the MP 124) for new requests for the edge NFs 130a-n. The MS 144 also submits the requests, obtained from the location queues 126a-z, to the edge NFs 130a-n.

The cloud proxy service 120 and the edge proxy service 140 together form a connectivity providing service that is deployed in the cloud network 102 and in the first on-premises network 104a. In one example embodiment, each of the cloud proxy service 120 and the edge proxy service 140 may include a security module (not shown) configured to provide secure communication with each other. The cloud proxy service 120 and the edge proxy service 140 facilitate a pull-pull API that relies on HTTP protocol, thereby avoiding security issues and requiring little to no configuration changes for the connectivity providing service.

The entities in the 5G architecture 100 are connected to one another via various network interfaces such as but not limited to the ones defined in 3GPP 5G standards (e.g., N8, N10, N12, and N40 as prescribed, at least in part by 3GPP Technical Specification (TS) 23.501, etc.).

By way of an example, consider that the AMF 130a (the source network function) is configured to send a request to the UDM 110b (the destination network function). The AMF 130*a* sends the requests directly to the 5G edge proxy function 142 instead of the UDM 110*b* itself. The 5G edge proxy function 142 inspects the request for any callback Uniform Resource Identifier (URI) attribute such as "deregCallbackUri" for an AMF registration for the 3GPP access procedure. The URI may also refer to a Uniform Resource Locator (URL). If the callback URI is present, the 5G edge proxy function 142 adds extra attributes to the callback URI and forwards the request to the 5G cloud proxy function 122. The 5G cloud proxy function 122 inspects the message for any callback URI attributes. If the callback URI attribute is present in the message, the 5G cloud proxy function 122 replaces a host address and a port number (location information) of the AMF 130*a* in the URI with a host address and a port number (location information) of the cloud proxy service 120 and then proxies the message to the UDM 110*b*. Location information is information that uniquely identifies an entity and/or information to reach or find an entity such as the host address and/or port number, etc. The response message from UDM 110*b* traverses the same path as the corresponding request but in a reverse order. The 5G cloud proxy function 122 does not change any attributes in the response.

By way of another example, consider that the UDM 110*b* (the source network function) is configured to send a request to the AMF 130*a* (the destination network function). The UDM 110*b* uses a callback URI provided by AMF 130*a* in the registration request (the edge-initiated request described above) to send the request to the AMF 130*a*. However, since that URI has been manipulated to have the cloud proxy service 120 as the destination function (instead of the AMF 130*a*), the 5G cloud proxy function 122 receives the request (instead of the AMF 130*a*) and responds to the UDM 110*b* with an acknowledgement for example. The 5G cloud proxy function 122 forwards the request to the MP 124 that publishes the message into a respective location-based queue or a message queue that corresponds to the location of the AMF 130*a*. For example, the message is published into the first location queue 126*a* of the location queues 126*a-z*. The first location queue 126*a* is selected based on information extracted from the callback URI and corresponds to the first on-premises network 104*a*. In an example embodiment, there is a one-to-one relationship between on-premises networks 104*a-z* and the location queues 126*a-z*. Using the queue structure ensures that the messages are delivered to a respective on-premises network in the same order as these messages were generated by the cloud NFs 110*a-n*.

The MS 144 of the edge proxy service 140 periodically polls the MP 124 requesting messages from a corresponding location-based queue (in this case, the first location queue 126*a*) using the same dispatching criteria that the MP 124 used. The MS 144 pulls a preconfigured amount of the messages from the selected location-based queue. That is, the MS 144 pulls a number of messages in the corresponding location-based queue up to a configurable number of messages. As such, it is possible to avoid a large response message if there are many requests in the corresponding location-based queue. The MS 144 submits the retrieved messages to the AMF 130*a* over the N8 interface or the N8 Replay interface.

In messages exchanged by the SMF 130*n* and the UDM 110*b*/CHF 110*n*, either SMF 130*n* initiated or UDM 110*b*/CHF 110*n* initiated, follow the same approach as messages exchanged by the AMF 130*a* and the UDM 110*b*. The messages exchanged by the AMF 130*a* and the AUSF 110*a* also follow the same approach. The cloud NFs 110*a-n* and the edge NFs 130*a-n* use the cloud proxy service 120 and the edge proxy service 140 to communicate with one another.

In one or more example embodiments, the cloud proxy service 120 and the edge proxy service 140 provide a pull-pull API that may result in a certain delay in delivering the requests initiated by the cloud NFs 110*a-n*. This delay does not significantly affect the overall functionality of the 5G architecture 100.

In one example, the delivery time of the cloud-initiated requests destined for the on-premises networks 104*a-z* is minimized (while the API endpoints on the edges are not exposed) by publishing the requests directly into Kafka topics, which are one example of the location queues 126*a-z*, that are directly exposed to the MS 144. The location queues 126*a-z* may be Kafka topics with the edge proxy service 140 directly subscribing to the respective location-based queue. While minimizing the message delivery time, this technique may require the firewall to allow some non-HTTP traffic from the on-premises networks 104*a-z* to the cloud network 102 and may not be compliant with security requirements described above. This example may require changes in the enterprise network firewall configuration.

To maintain security compliance, according to another example, a polling mechanism is used. Specifically, the MP 124 publishes the requests into the location queues 126*a-z*. The MS 144 pulls the messages from the respective location-based queue of the location queues 126*a-z* based on periodically polling the cloud proxy service 120. The polling mechanism inevitably introduces some amount of delay. To minimize the delay in pulling the messages from the location queues 126*a-n*, each poll request may return up to a preset or predetermine number of requests. The number of requests or messages is a configurable batch size (maximum batch size). If the poll request returns a number of requests equal to the configurable batch size, another or new poll request is sent to the cloud proxy service 120 without waiting for a predetermined time interval because there may be additional messages in the location-based queue that need to be retrieved and replayed to the respective edge NFs 130*a-n*. That is, the edge proxy service 140 may periodically poll the cloud proxy service 120 but the polling interval may vary based on the number of messages retrieved from the respective location-based queue. Repeated polling may occur without waiting a predetermined time interval based on the number of messages retrieved from the location-based queue being equal to the configurable batch size.

In the above example, the cloud NFs 110*a-n* are decoupled from the edge NFs 130*a-n* such that the cloud proxy service 120 responds back to the cloud NFs 110*a-n* instead waiting for the answer from the edge NFs 130*a-n*. That is, in response to the cloud-initiated requests, the cloud proxy service 120 responds back to the cloud NFs 110*a-n* with a 200 OK for the 5G API after placing the request in the location queues 126*a-z* and without waiting for the request to be submitted to the edge NFs 130*a-n* and/or without the actual responses coming back from the edge NFs 130*a-n*. This example prevents timeouts and retries from the cloud NFs 110*a-n* when the edge is isolated from the cloud network 102 for short intervals of time.

According to another example, the cloud NFs 110*a-n* are tightly coupled to the edge NFs 130*a-n*. In this example, the cloud NFs 110*a-n* wait for the actual request to be pushed all the way to the edge NFs 130*a-n* and for the actual responses to be propagated back.

These are some non-limiting examples of seamlessly connecting the cloud NFs 110*a-n* with the edge NF 130*a-n* of a connectivity providing service such as 5GaaS.

For the edge-initiated requests, the edge proxy service 140 proxies the requests from the edge NFs 130*a-n* to the cloud proxy service 120 and relays responses back to each respective edge NF. The 5G edge proxy function 142 also enriches the callback URI in the request (if present) with the originating or source NF tag (obtained from User-Agent HTTP header attribute) and edge location identifier (obtained from edge deployment configuration). For cloud-initiated requests, the MS 144 periodically polls the cloud network 102 (e.g., the MP 124 of the cloud proxy service 120) for new requests for the edge NFs 130*a-n*. The poll request has an edge location identifier as a parameter therein. The MP 124 selects the location-based queue to check for new requests based on the edge location identifier provided in the poll request. The MS 144 is further configured to submit the requests, obtained from a selected location-based queue of the location queues 126*a-z*, to the edge NFs 130*a-n*.

Meanwhile, for the edge-initiated requests, the cloud proxy service 120 proxies the edge-initiated requests to the cloud NFs 110*a-n* and relays back the responses to the edge proxy service 140. The 5G cloud proxy function 122 dispatches the edge-initiated requests to the cloud NFs 110*a-n*. The 5G cloud proxy function 122 also updates a callback URI (also referred to as Uniform Resource Locator (URL)), in the request (if present) by replacing the host address and port number of the edge NF with its own host address and port number (location information). For the cloud-initiated requests, the cloud proxy service 120 receives requests from the cloud NFs 110*a-n* and communicates with the MP 124 to place the requests into the first location queue 126*a* of the location queues 126*a-z* based on the intended destination of the requests. There is a queue for each on-premises location. For example, one location-based queue dedicated to the first-on-premises network 104*a* at a location A and another location-based queue dedicated to the second on-premises network 104*z* at a location Z. Messages for the edge NFs 130*a-n* deployed in one particular location are placed in the same queue (regardless of the specific destination NF). In other words, messages for both the AMF 130*a* and the SMF 130*n* are placed in the same location-based queue in one example embodiment. At the request of the edge proxy service 140 (e.g., when polled), the MP 124 extracts the cloud-initiated requests from the location-based queue of the location queues 126*a-z*, that corresponds to the edge proxy location identifier and delivers these requests to the edge proxy service 140.

Figure 2:
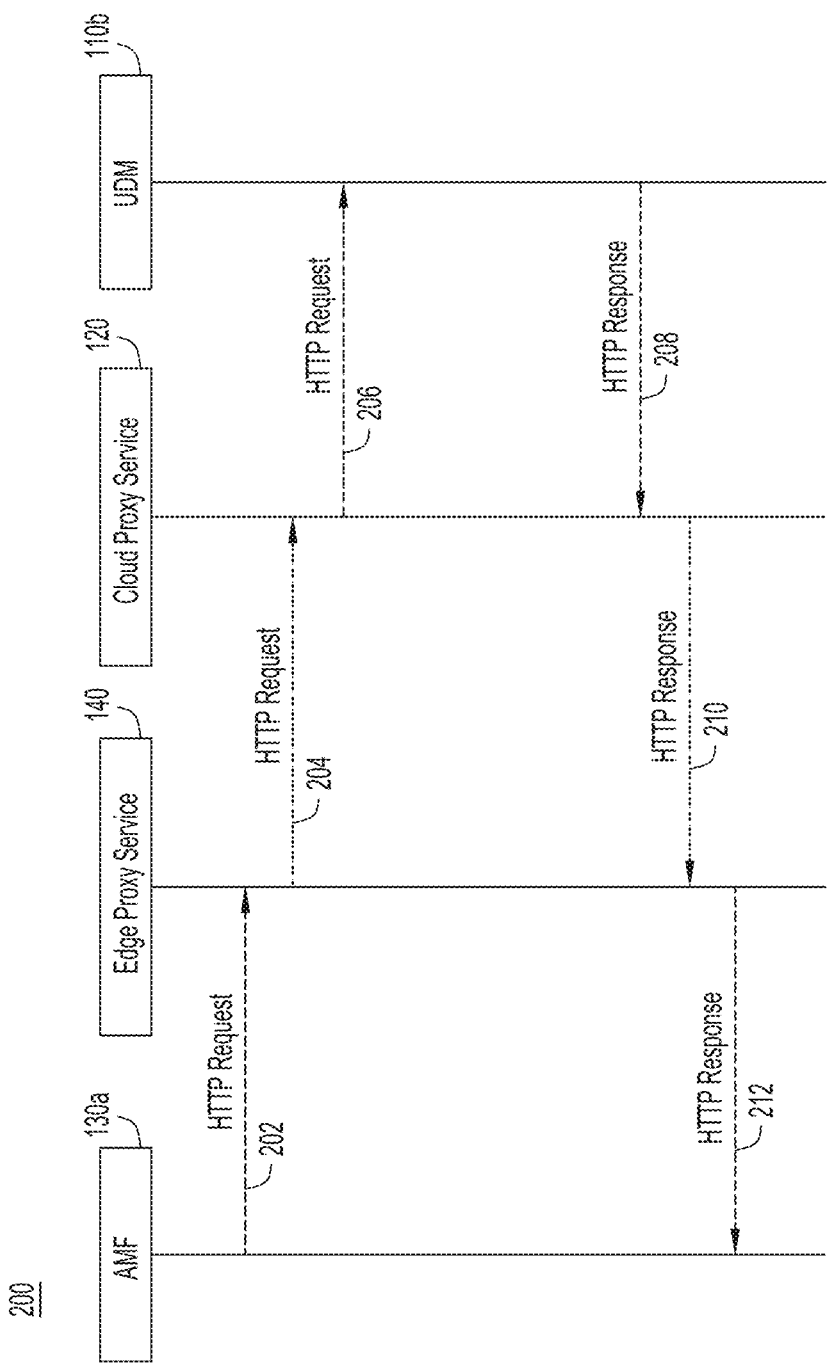
FIG. 2 is a flow diagram illustrating a method of an edge network function of a 5G network initiating a request toward a cloud network function of the 5G network, according to an example embodiment.

With continued reference to FIG. 1, FIG. 2 is a flow diagram illustrating a method 200 of an edge network function (e.g., the AMF 130*a*) of the 5G network initiating a request toward a cloud network function (e.g., the UDM 110*b*) of the 5G network, according to an example embodiment. This edge-initiated request is handled by the edge proxy service 140 (i.e., the 5G edge proxy function 142) and the cloud proxy service 120 (i.e., the 5G cloud proxy function 122).

The method 200 involves, at 202, the AMF 130*a* sends a request towards the UDM 110*b* in a form of an HTTP request. The AMF 130*a* is configured to send the requests directly to the edge proxy service 140 instead of the UDM 110*b* itself.

At 204, the edge proxy service 140, via the 5G edge proxy function 142, inspects all the attributes of the HTTP request for a callback URI, modifies the callback URI if found, and then relays the modified HTTP request to the cloud proxy service 120, via the 5G cloud proxy function 122. Specifically, the edge proxy service 140, via the 5G edge proxy function 142, inspects the HTTP request for any callback URI attribute such as "deregCallbackUri" of the AMF 130*a*. If any callback URI attribute is found, the following changes are made. The edge proxy service 140 modifies the callback URI to include a tag that identifies the source NF (AMF 130*a* in this example) and location information for itself. Using the source NF tag, the MS 144 knows which NF should receive the callback request and using the location information of the edge proxy service 140, the MP 124 selects a location-based queue from the location queues 126*a-z* for the callback request. For example, the UDM 110*b* requests to the AMF 130*a* are added to a location-based queue dedicated to the location of the edge proxy service 140, such as the first location queue 126*a*.

At 206, the cloud proxy service 120, via the 5G cloud proxy function 122, inspects the modified HTTP request received from the edge proxy service 140/5G edge proxy function 142 and forwards the modified HTTP request to the destination network function (the UDM 110*b* in this example). The cloud proxy service 120/5G cloud proxy function 122 inspects the attributes of the modified HTTP request for a callback URI and to relay the request to the UDM 110*b* based on its own configuration information. Additionally, any callback URI attribute that is found, the host information and port number of the source network function (the AMF 130*a*) is changed to point to the cloud proxy service 120/5G cloud proxy function 122 so that the callback is received at the cloud proxy service 120/5G cloud proxy function 122. In other words, the cloud proxy service 120, via 5G cloud proxy function 122, also inspects the modified HTTP request for any callback URI attribute and, if present replaces the host and port of the AMF 130*a* in that URI with the host and port of the cloud proxy service 120/5G cloud proxy function 122 and only then proxies the message to the UDM 110*b*. For example, the URL may include {apiRoot}/nudm-sdm/{apiVersion} for the cloud destination network function type such as the UDM 110*b*. Based on configuration, the cloud proxy service 120/cloud proxy function 122 relays the message to the correct IP address and port.

At 208, the UDM 110*b* sends the HTTP response back to cloud proxy service 120/5G cloud proxy function 122. The HTTP response travels on the same path as the HTTP request but in a reverse order. The cloud proxy service 120/5G cloud proxy function 122 does not change any attributes in the response.

At 210, the cloud proxy service 120/5G cloud proxy function 122 relays the HTTP response back to edge proxy service 140/5G edge proxy function 142.

At 212, the edge proxy service 140, via the 5G edge proxy function 142, relays the HTTP response back to the AMF 130*a*. If the response status code is a "201 Created" and the Location header attribute is present, the host location and port number of the UDM 110*b* of the location URL are replaced with the host location and port number of the edge proxy service 140/5G edge proxy function 142 (location information of the edge proxy service 140/5G edge proxy function 142). In other words, the edge proxy service 140, via 5G edge proxy function 142, inspects the headers in the HTTP response for the location URL and, if present, manipulates or modifies the URL to point to the edge proxy service 140/5G edge proxy function 142 so that further calls to the URL are received by the edge proxy service 140/5G edge proxy function 142.

Figure 3A:
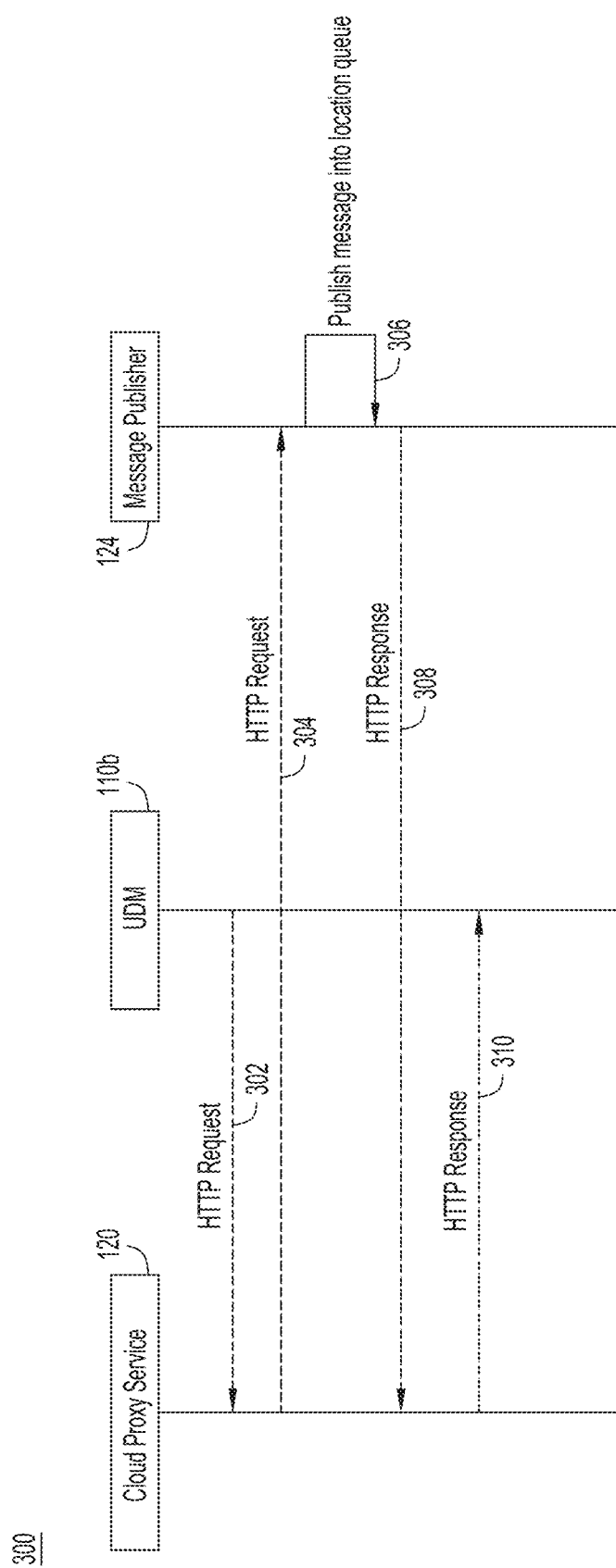
FIGS. 3A and 3B are flow diagrams illustrating a method of a cloud network function of the 5G network initiating a request toward an edge network function of the 5G network, according to an example embodiment.
Figure 3B:
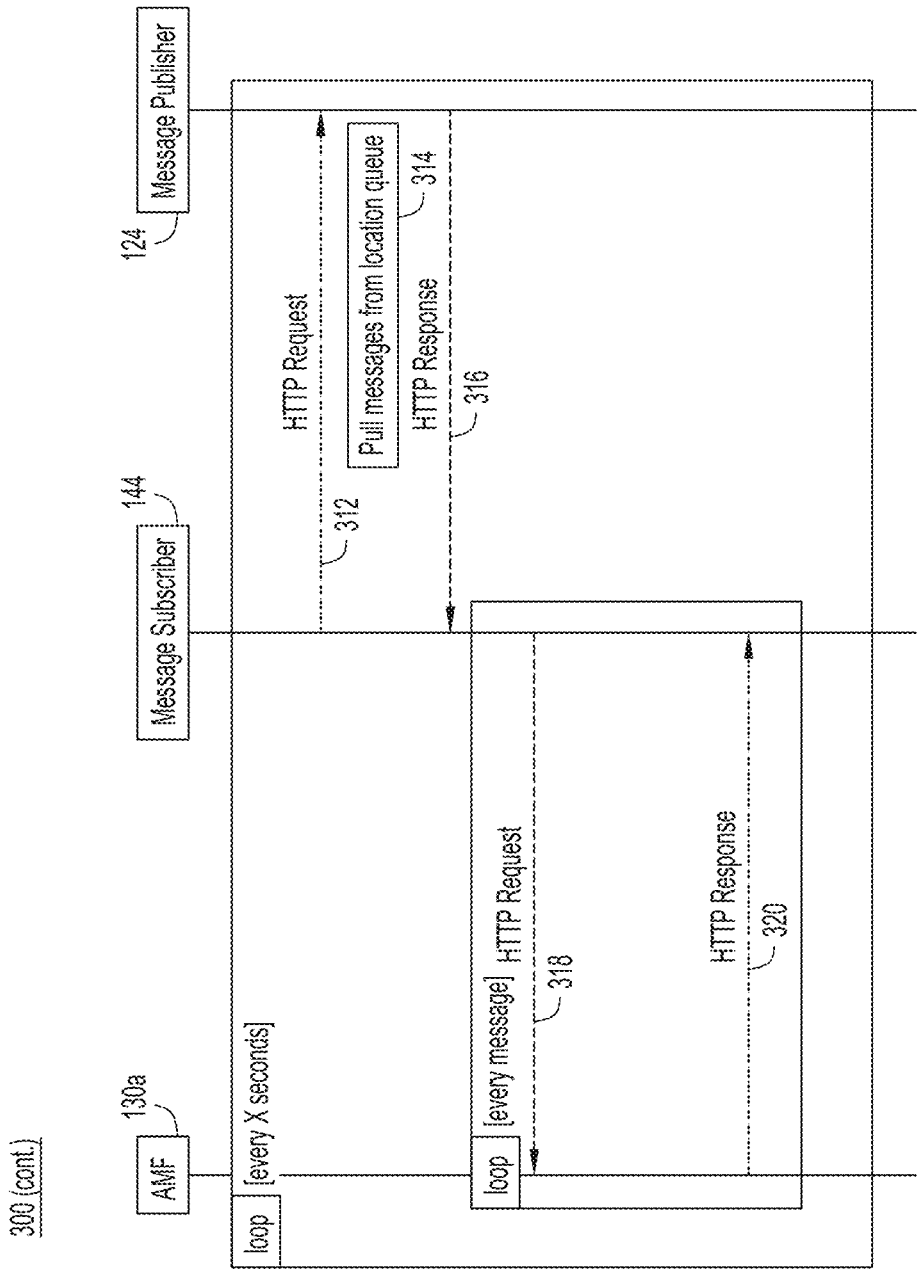

With continued reference to FIG. 1, FIGS. 3A and 3B are flow diagrams illustrating a method 300 of a cloud network function (the UDM 110*b*) of the 5G network initiating a request toward an edge network function (the AMF 130a) of the 5G network, according to an example embodiment.

FIG. 3A is a flow diagram illustrating the method 300 handling a cloud-initiated request at a cloud side, according to an example embodiment. Specifically, FIG. 3A illustrates queueing a notification from the UDM 110b in the cloud network 102, according to an example embodiment.

The method 300 involves at 302, the UDM 110b initiates an HTTP request for a destination network function deployed in the first on-premises network 104a (the AMF 130a). Since host identifier and port identifier (location information) of the AMF 130a in the callback URI has been replaced with the host identifier and port number (location information) of the cloud proxy service 120/5G cloud proxy function 122, the cloud proxy service 120, via the 5G cloud proxy function 122, receives the HTTP request. In other words, the UDM 110b used the callback URI provided in the edge-initiated HTTP request described in FIG. 2. Since the URI of the edge-initiated HTTP request has been manipulated to include the location information of the cloud proxy service 120 as the destination network function instead of the AMF 130a, the cloud proxy service 120 receives the HTTP request.

At 304, the cloud proxy service 120 (using the 5G cloud proxy function 122) passes the request to the Message Publisher 124. At 306, the Message Publisher 124 publishes the HTTP request in a location-based queue dedicated to the location of the first on-premises network 104a (the AMF 130a) from the location queues 126a-z. The AMF unique location identifier is extracted from the callback URI. At 308, the Message Publisher 124 notifies the cloud proxy service 120 that it has successfully published the request in the respective location-based queue of the AMF 130a. At 310, the cloud proxy service 120 sends an HTTP response to the UDM 110b with a Status Code=200 OK, acknowledging receipt and processing of the HTTP request.

FIG. 3B is a flow diagram illustrating the method 300 handling the cloud-initiated request at an edge side of the first on-premises network 104a, according to an example embodiment. FIG. 3B illustrates the periodic pulling of the cloud-initiated requests (messages) by the Message Subscriber 144 of the edge proxy service 140 and submitting to the edge NFs 130a-n.

The method 300 involves at 312, the Message Subscriber 144 sending an HTTP GET request to the Message Publisher 124 to fetch messages (HTTP requests) from the location-based queue corresponding to the local unique location identifier (location information of the edge proxy service 140).

At 314, the Message Publisher 124 pulls the HTTP requests from the location-based queue (that corresponds to the AMF 130a). At 316, the Message Publisher 124 provides the pulled HTTP requests (the message batch) in an HTTP response to the Message Subscriber 144. At 318, for every message in the current message batch, the Message Subscriber 144 converts the message into an HTTP request and posts it to the destination edge network function (the AMF 130a). The Message Subscriber 144 inspects the callback URI for the destination edge NF type (e.g., the AMF 130a, the SMF 130n, etc.), removes any additional information it has added to the callback URI, and submits the HTTP request to the correct host and port of the edge NF based on the configuration. At 320, the Message Subscriber 144 receives an HTTP response from the AMF 130a acknowledging receipt of the message.

The Message Subscriber 144 periodically polls (every x second for example) the Message Publisher 124 for its location-based queue (the first location queue 126a) (using the same dispatching criteria that the Message Publisher 124 used) and pulls the messages from that location-based queue (within a predetermined threshold number) generating a message batch. The message batch is provided in the HTTP response. The Message Subscriber 144 then relays the messages in the message batch to the local edge network functions.

Figure 4:
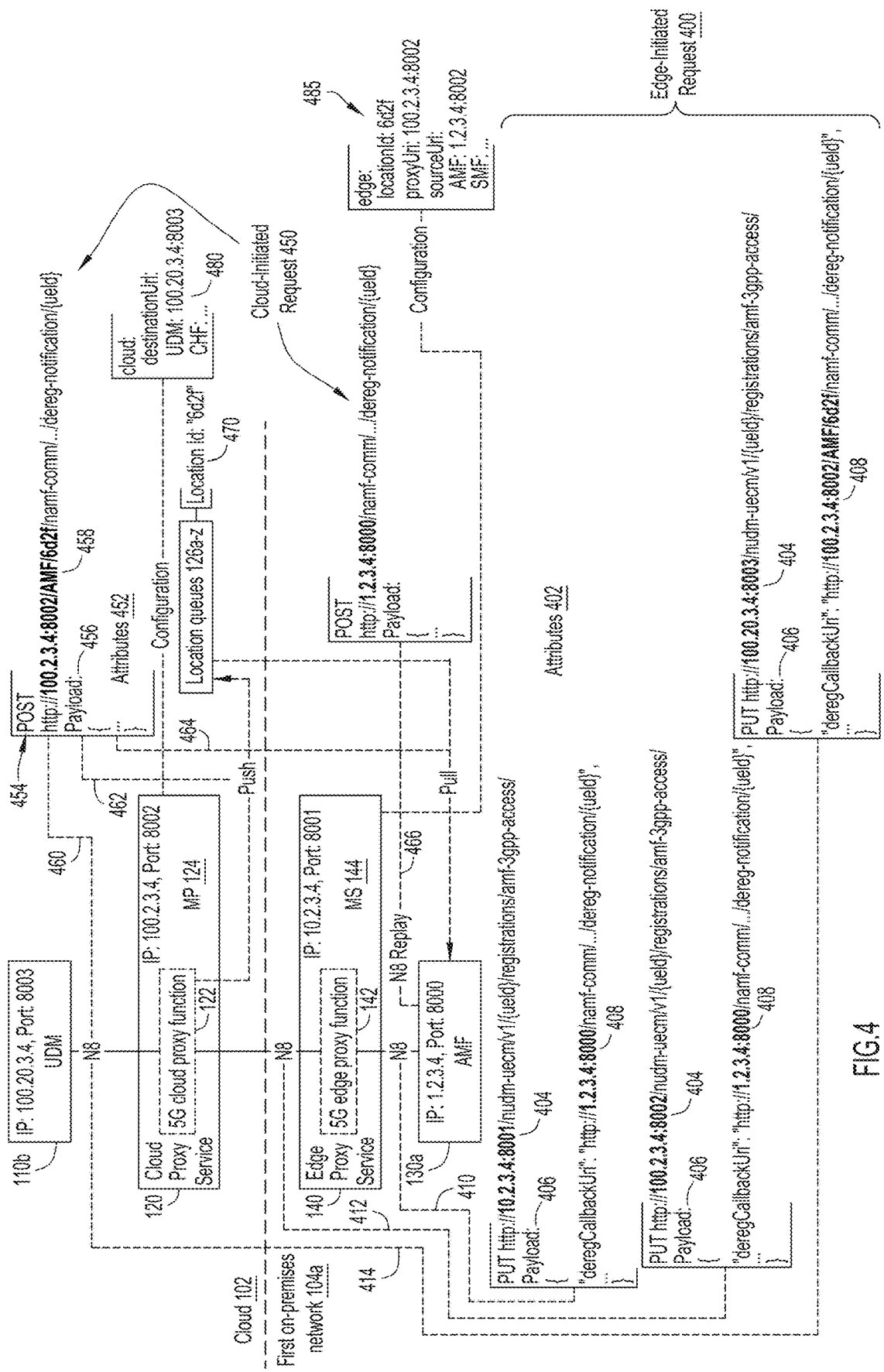
FIG. 4 is a diagram illustrating an edge-initiated request and a cloud-initiated request traversing from a source network function to a destination network function of the 5G network, according to an example embodiment.

With continued reference to FIG. 1, FIG. 4 is a diagram illustrating an edge-initiated request 400 and a cloud-initiated request 450 traversing from a source network function to a destination network function, according to an example embodiment. The edge-initiated request 400 is generated by an edge network function (e.g., the AMF 130a) and the cloud-initiated request 450 is generated by the cloud network function (e.g., the UDM 110b). The edge-initiated request 400 and the cloud-initiated request 450 traverse the cloud proxy service 120 (the 5G cloud proxy function 122, the Message Publisher (MP) 124, and one or more of the location queues 126a-z of the cloud network 102) and the edge proxy service 140 (the 5G edge proxy function 142 and the Message Subscriber (MS) 144 of the first on-premises network 104a).

Each entity in the 5GaaS includes location information such as an IP address and a port. For example, the AMF 130a has an IP address of 1.2.3.4 and a port number of 8000, the edge proxy service 140 has an IP address of 10.2.3.4 and a port number of 8001, the cloud proxy service 120 has an IP address of 100.2.3.4 and a port number of 8002, and the UDM 110b has an IP address of 100.20.3.4 and a port number of 8003. The IP address and the port number are just one non-limiting example of the location information. The cloud proxy service 120 has access to cloud configuration 480 that includes location information of the cloud proxy service 120, and a destination URI for each of the cloud NFs 110a-n. By way of an example, the cloud proxy service 120 has access to a first mapping between URL path prefix and a destination cloud NF tag and a second mapping between the destination cloud NF tag and a destination cloud NF host and port such as:

destinationUrl:
nudm-uecm/v1: UDM
destinationNf:
UDM: 100.20.3.4:8003

The edge proxy service 140 has access to edge configuration 485 that includes location information of the edge proxy service 140 as "6d2f", URI address of the cloud proxy service 120, and a destination URI for each of the edge NFs 130a-n.

The edge-initiated request 400 includes a number of attributes 402 provided in a header 404 and/or in a payload 406 of a packet. The edge-initiated request 400 may include data traffic, control commands, etc. The attributes 402 include a first attribute in the header 404 that has identification and location information for the destination network function. The payload 406 includes one or more data and/or commands for the destination network function and may also include a callback URI 408 identifying the source network function.

At 410, the AMF 130a generates the edge-initiated request 400 and sends it to the edge proxy service 140. For example, the edge-initiated request 400 is a registration request with destination location information in the header 404 as "PUT http://10.2.3.4:8001/nudm-uecm/v1/{ueId}/registrations/amf-3gpp-access/" (location information of the edge proxy service 140). The edge-initiated request 400 further includes the payload 406 that identifies an instance of the AMF 130*a* and includes the callback URI 408 (a deregCallbackUri http://1.2.3.4:8000/ . . . ") that identifies the source network function (the location information of the AMF 130*a*).

At 412, the edge proxy service 140 (via the 5G edge proxy function 142) modifies the edge-initiated request 400 by enriching the callback URI 408 by adding the tag for the source network function "AMF" based on the User-Agent HTTP request header attribute and the location identification "6d2f" of the edge proxy service 140 based on its own configuration information (edge configuration) 485. The edge proxy service 140 then forwards the modified edge-initiated request 400 to the cloud proxy service 120.

At 414, the cloud proxy service 120 (via the 5G cloud proxy function 122) further modifies the edge-initiated request 400 by modifying the location information in the callback URI 408 with its own location information "100.2.3.4:8002". The cloud proxy service 120 then forwards the modified edge-initiated request 400 to the UDM 110*b* based on its own configuration 480.

The UDM 110*b* uses the location information in the callback URI 408 to send requests to the edge NFs 130*a-n*. For example, the cloud-initiated request 450 includes one or more attributes 452 in a header 454 and/or a payload 456 similar to the edge-initiated request 400.

At 460, the UDM 110*b* generates the cloud-initiated request 450 using information learned from the edge-initiated request 400. The header 454 includes the location information 458 obtained from the callback URI 408. The location information 458 includes the location of the cloud proxy service 120 "100.2.3.4:8002" and the tag of the destination network function "AMF/6d2f/ . . . ."

At 462, the 5G cloud proxy function 122 via the MP 124 publishes the request in one of the location queues 126*a-z* based on the location information 458. The MP 124 selects the location-based queue 470 with a location identifier "6d2f" that corresponds to the location information of the edge proxy service 140.

At 464, the MS 144 periodically polls the MP 124 for any cloud-initiated request destined for the edge proxy service 140. The MS 144, via the MP 124, pulls the cloud-initiated request 450 from the location-based queue 470 based on the location identifier "6d2f".

At 466, the 5G edge proxy function 142 submits cloud-initiated request 450 to AMF 130*a* based on the tag "AMF" using the edge configuration 485.

Figure 5:
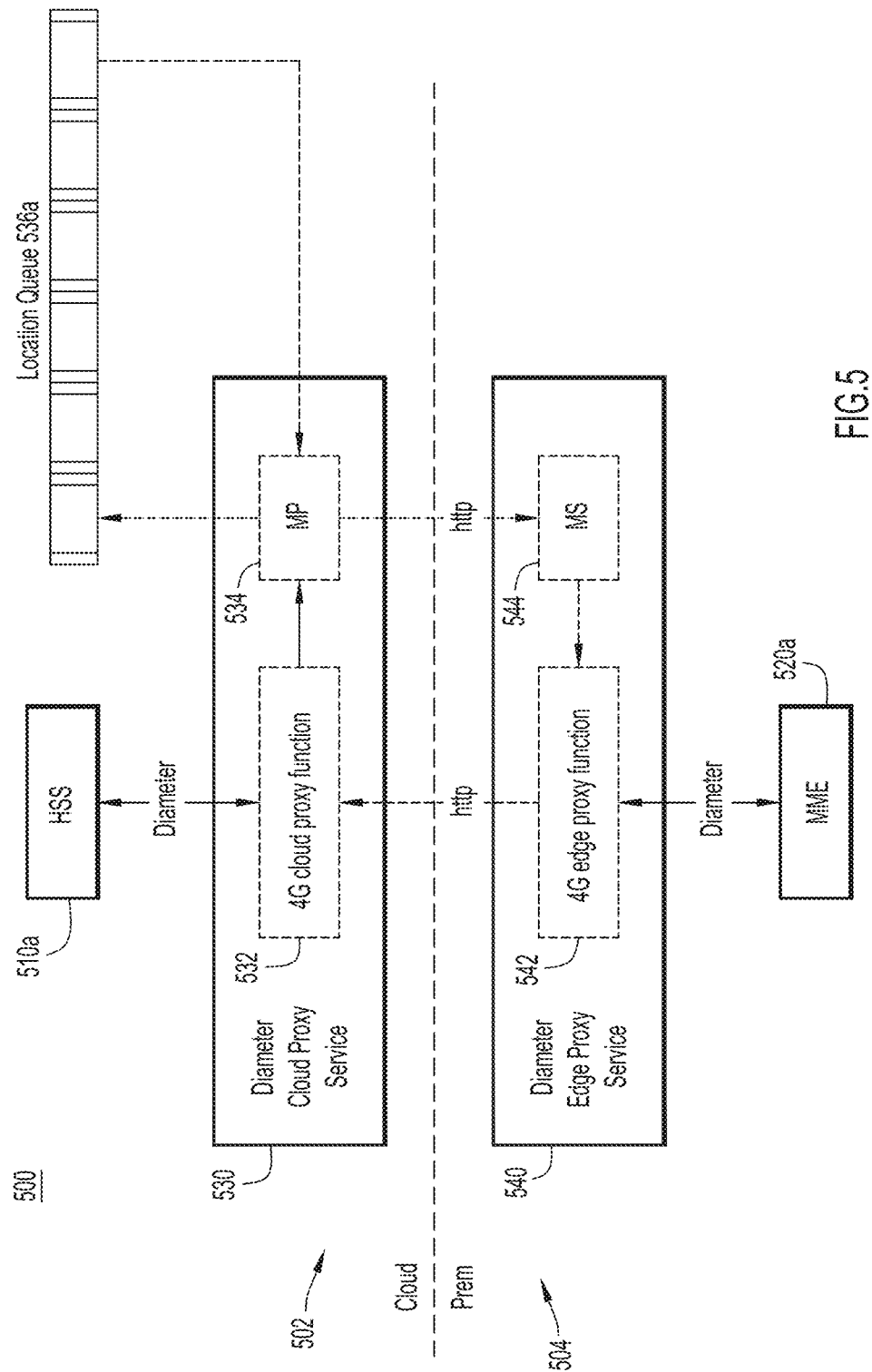
FIG. 5 is a block diagram illustrating 4G architecture in which a pair of proxies provides seamless connectivity between network functions deployed in an on-premises network and in a cloud network, according to another example embodiment.

FIG. 5 is a block diagram illustrating a 4G architecture 500 in which a pair of proxies provide seamless connectivity between the NFs deployed at the edge of one or more on-premises networks and in the cloud network, according to another example embodiment. The 4G architecture 500 includes a cloud network 502 and an on-premises network (Prem) 504. While only one on-premises network 504 is depicted in FIG. 5, it is understood that multiple on-premises networks may exist depending on a particular deployment of the 4G architecture 500. A 4G connectivity providing service is established using these NFs.

The 4G architecture 500 includes a plurality of NFs, some of which are hosted in the cloud network 502 and some of which are hosted in the on-premises network 504. An example of a cloud NF in the 4G network is a Home Subscriber Server (HSS) 510*a* responsible for handling subscriber profiles and an example of the edge NF is a Mobility Management Entity (MME) 520*a* responsible for handling connections and mobility management tasks.

Some of the entities of the 4G architecture 500 use Diameter network interface to communicate with one another. Accordingly, the proxy service includes a Diameter cloud proxy service 530 and a Diameter edge proxy service 540, each of which include a parser or a converter for converting Diameter messages used in the 4G communication into the HTTP messages and back. Such a conversion is provided so that the Diameter traffic between the MME 520*a* and the HSS 510*a* can pass through the enterprise firewall such as a firewall of the on-premises network 504 and be secured. The Diameter edge proxy service 540 terminates the MME 520*a* Diameter connection while the Diameter cloud proxy service 530 terminates the HSS 510*a* Diameter connection. The Diameter cloud proxy service 530 includes a 4G cloud proxy function 532 and a Message Publisher (MP) 534. The Diameter edge proxy service 540 includes a 4G edge proxy function 542 and a Message Subscriber (MS) 544. In one example embodiment, each of the Diameter cloud proxy service 530 and the Diameter edge proxy service 540 include a security module (not shown) configured to provide secure communication.

For MME-initiated Diameter requests (edge-initiated requests), the Diameter edge proxy service 540 (using the 4G edge proxy function 542) receives a Diameter request originating from the MME 520*a*, marshals the request into JavaScript Object Notation (JSON) format, and sends it as the HTTP body of a POST request to the Diameter Cloud Proxy service 530. The Diameter Cloud Proxy service 530 (using the 4G cloud proxy function 532) unmarshals the JSON format body of the message into a Diameter request and finds a suitable peer to deliver that message (based on an application identifier (Id), destination realm, destination host, etc.), and delivers the Diameter request to that peer. It is possible that the Diameter peer is a Diameter Routing Agent (DRA), not shown, and not the HSS 510*a*. The Diameter response message from the HSS 510*a* travels on the same path as the corresponding request but in reverse order.

For the Diameter requests initiated by the HSS 510*a* (cloud-initiated requests), the Diameter cloud proxy service 530 (using the 4G cloud proxy function 532) receives the Diameter request originating from the HSS 510*a* (directly or via the DRA) and immediately responds to HSS 510*a* with Result-Code: 2001 (DIAMETER_SUCCESS). Then, the Diameter cloud proxy service 530 (using the 4G cloud proxy function 532 and the Message Publisher 534) serializes the Diameter request into a JSON format and publishes the JSON message in a message queue corresponding to the destination (the Diameter edge proxy service 540 that corresponds with the MME 520*a*) from the location queue 536*a*.

In one example, the queue selection criteria are based on the MME Diameter host name (e.g., mmeX-<location-Id>.epc.mnc<MNC>.mcc<MCC>.3gppnetwork.org). In an alternative example embodiment, a location identifier is added to a session identifier. The MS 544 periodically polls the MP 534 for its corresponding location-based queue passing its location identifier as a query parameter (i.e., using the same dispatching criteria that the MP 534 uses). The MS 544 pulls the messages, via the MP 534, from that location-based queue (the location queue 536*a*) and starts submitting these messages one by one as HTTP POST requests to the 4G edge proxy function 542. The 4G edge proxy function 542 receives the HTTP POST request, unmarshals the JSON body to a Diameter request, finds a destination peer for the message (based on application Id, destination realm, destination host, etc.), and delivers the Diameter request to that peer (e.g. MME 520*a*).

The Diameter edge proxy service 540 (using the 4G edge proxy function 542) processes the edge-initiated requests by converting the Diameter message to the HTTP message and by forwarding the converted HTTP message to the Diameter cloud proxy service 530. For the cloud-initiated requests, the edge proxy service 540 (using the 4G cloud proxy function 532) periodically polls the Diameter cloud proxy service 530 for new requests for the edge NFs and submits the requests to the edge NFs.

The Diameter cloud proxy service 530 (using the 4G cloud proxy function 532) processes the edge-initiated requests by converting the HTTP message received from the Diameter edge proxy service 540 to a Diameter message and dispatches the Diameter message to the destination cloud NF. For the cloud-initiated requests, the Diameter cloud proxy service 530 (using the 4G cloud proxy function 532) receives Diameter requests from the cloud NFs, serializes the Diameter requests into a JSON body (using the Message Publisher 534), and places the JSON requests (HTTP requests) into a respective location queue (the location queue 536a). The Diameter cloud proxy service 530 (using the Message Publisher 534) further extracts the JSON requests from the respective location queue 536a and delivers them when polled by the Diameter edge proxy service 540/the MS 544.

Figure 6:
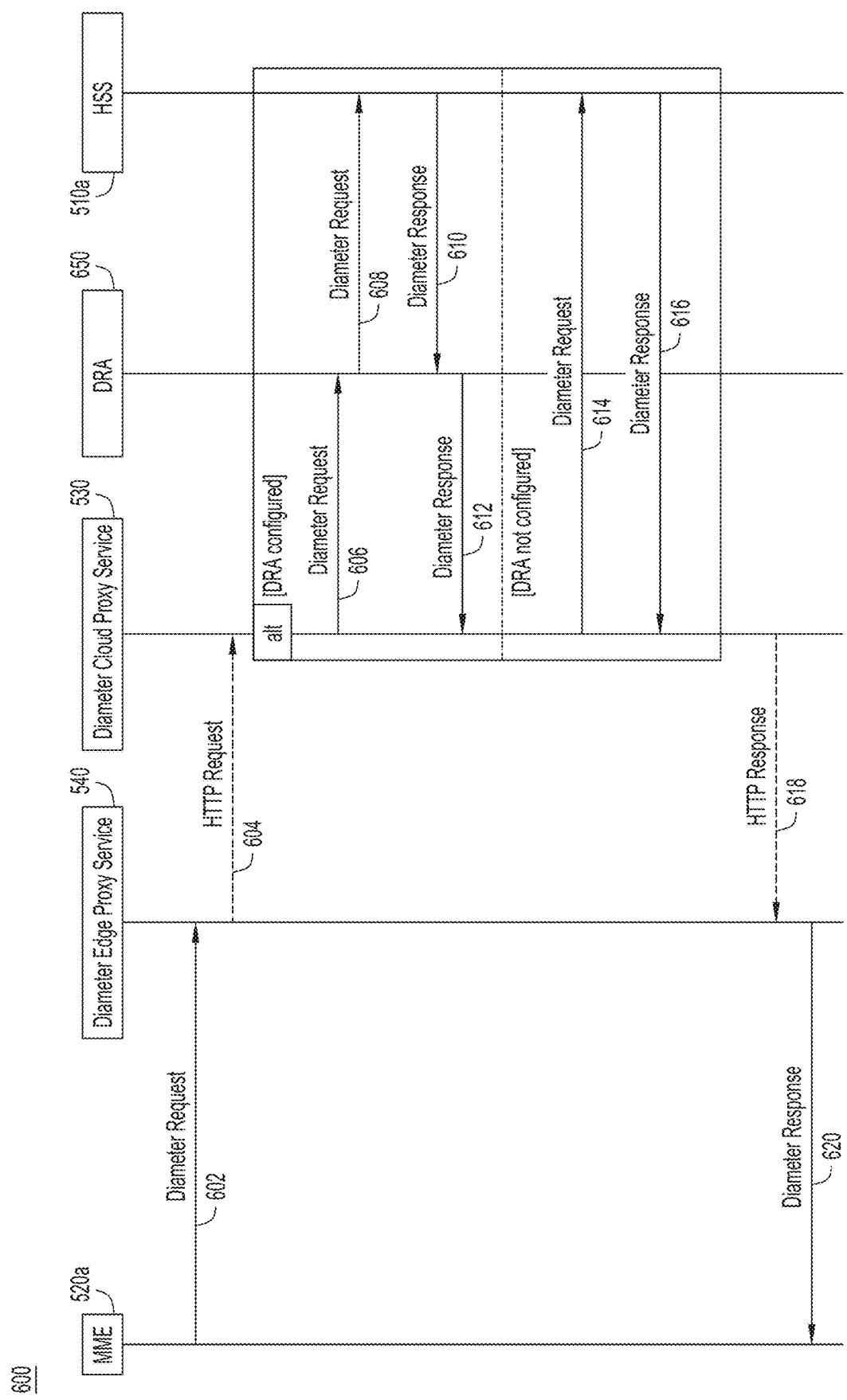
FIG. 6 is a flow diagram illustrating a method of an edge network function of the 4G network initiating a request toward a cloud network function of the 4G network, according to another example embodiment.

With continued reference to FIG. 5, FIG. 6 is a flow diagram illustrating a method 600 of the MME 520a of the 4G network initiating a request for the HSS 510a of the 4G network, according to another example embodiment. The method 600 may include a DRA 650 configured to receive the Diameter request from the Diameter Cloud Proxy service 530 and to forward the Diameter request to a respective cloud NF such as the HSS 510a. The Diameter Cloud Proxy service 530 uses the 4G cloud proxy function 532 and the Diameter Edge Proxy service 540 uses the 4G edge proxy function 542 to perform the operations described herein.

The method 600 involves at 602, the MME 520a initiating a Diameter request for a cloud destination NF (the HSS 510a). At 604, the Diameter request is received by the Diameter edge proxy service 540, which converts the Diameter request to an HTTP request. At 604, the Diameter edge proxy service 540 forwards the HTTP request to the Diameter cloud proxy service 530. The Diameter cloud proxy service 530 converts the HTTP request to a Diameter request and at 606, provides the Diameter request to the DRA 650 when the DRA 650 is configured. At 608, the DRA 650 forwards the Diameter request to the HSS 510a and at 610, receives a Diameter response from the HSS 510a. At 612, the DRA 650 then forwards the Diameter response to the Diameter cloud proxy service 530.

In an alternative example embodiment, when the DRA 650 is not configured, at 614, the cloud proxy service 530 transmits the Diameter request directly to the HSS 510a and at 616, obtains the Diameter response from the HSS 510a.

The Diameter cloud proxy service 530 converts the Diameter response to the HTTP response and at 618, transmits the HTTP response to the Diameter edge proxy service 540. The Diameter edge proxy service 540 converts the HTTP response to a Diameter response and at 620, transmits the Diameter response back to the MME 520a.

Figure 7A:
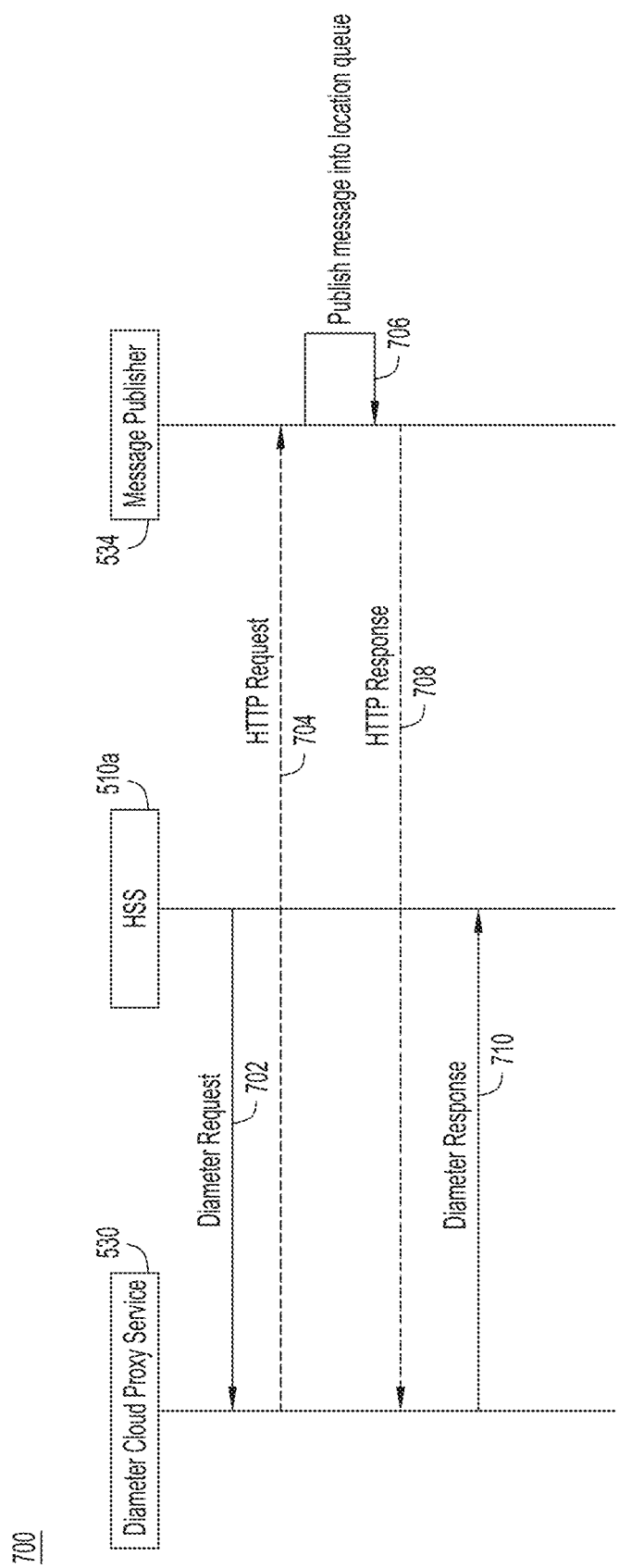
FIGS. 7A and 7B are flow diagrams illustrating a method of a cloud network function of the 4G network initiating a request toward an edge network function of the 4G network, according to another example embodiment.
Figure 7B:
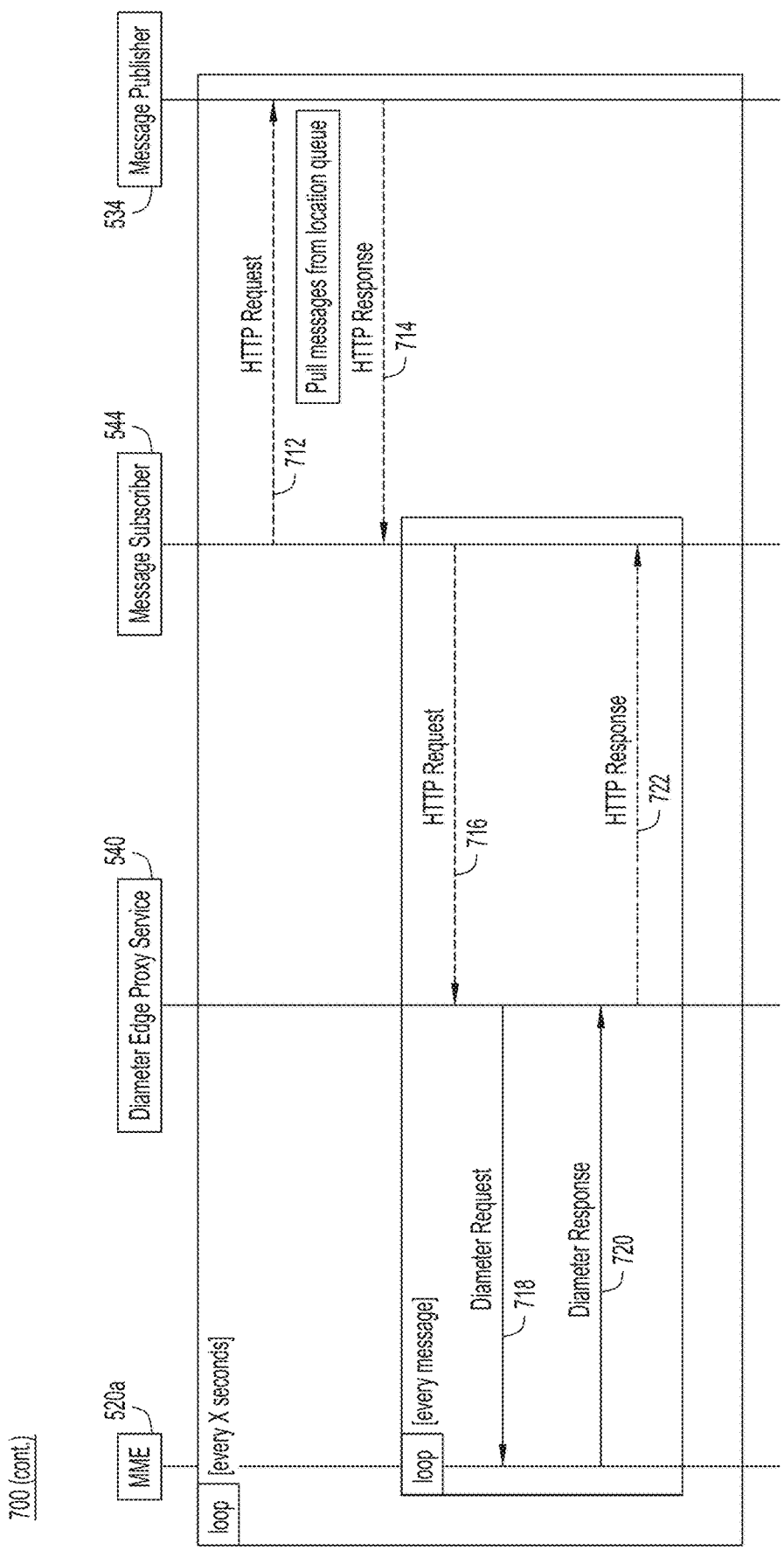

With continued reference to FIG. 5, FIGS. 7A and 7B are flow diagrams illustrating a method 700 of the HSS 510a of the 4G network initiating a request to the MME 520a of the 4G network, according to another example embodiment.

FIG. 7A is a flow diagram illustrating the method 700 handling a cloud-initiated request at a cloud side, according to another example embodiment. Specifically, FIG. 7A illustrates queueing a notification from the HSS 510a in the cloud network 502.

At 702, the HSS 510a initiates a Diameter request towards the MME 520a, which is received by the Diameter cloud proxy service 530. At 704, the Diameter cloud proxy service 530 (using the 4G cloud proxy function 532) serializes the request to JSON format generating an HTTP request and passes it to the Message Publisher 534.

At 706, the MP 534 publishes the request to a respective location-based queue (such as the location queue 536a, a queue named after location id extracted from the MME Origin-Host AVP value). At 708, the MP 534 notifies the Diameter cloud proxy service 530 that it has successfully published the HTTP request. At 710, the Diameter cloud proxy service 530 (using the 4G cloud proxy function 532) responds back to the HSS 510a with a Result-Code=2001 (DIAMETER SUCCESS). In one example, the MME 520a origin host follows the format mmeX-<location-Id>.epc.mnc<MNC>.mcc<MCC>.3gppnetwork.org so that it is unique across different enterprises and enterprise locations.

FIG. 7B is a flow diagram illustrating the method 700 handling a cloud-initiated request at an edge of the on-premises network 504, according to another example embodiment. Specifically, FIG. 7B illustrates pulling a notification from the Diameter cloud proxy service 530 to the Diameter edge proxy service 540 and relaying the notification to the MME 520a at an edge of the on-premises network 504.

Specifically, at 712, the Message Subscriber 544 sends an HTTP GET request to fetch messages from the location-based queue corresponding to the local MME Diameter host (e.g., the Diameter edge proxy service 540). At 714, the Message Publisher 534 pulls messages from the location-based queue, generates a message batch, and responds with an HTTP response that includes the message batch. The Message Subscriber 544 may periodically poll (every X second) the message publisher and/or poll repeatedly if the message batch in the HTTP response is at a maximum size, as explained above.

At 716, for every message in the message batch, the Message Subscriber 544 converts each message in the batch into an HTTP POST request and posts it to the Diameter edge proxy service 540. At 718, the Diameter edge proxy service 540 (using the 4G edge proxy function 542) converts the JSON message body to a Diameter request, finds a suitable Diameter peer that can deliver the Diameter request to the MME 520a, and sends it to the peer to the MME 520a. At 720, the Diameter edge proxy service 540 receives the Diameter response from the MME 520a. At 722, the Diameter edge proxy service 540 may optionally serialize the Diameter response to a JSON and deliver it to the Message Subscriber 544 in an HTTP response message body.

Techniques herein provide for deployment of a 4G/5G network with NFs deployed both at on-premises networks and in a cloud. The techniques are fully 3GPP compliant and configured to function with any NF vendor. Additionally, the techniques do not require NF customization and support multiple enterprises and/or locations. The edge NFs and cloud NFs communicate seamlessly using a proxy service without requiring a tunnel and are fully 3GPP compliant.

Figure 8:
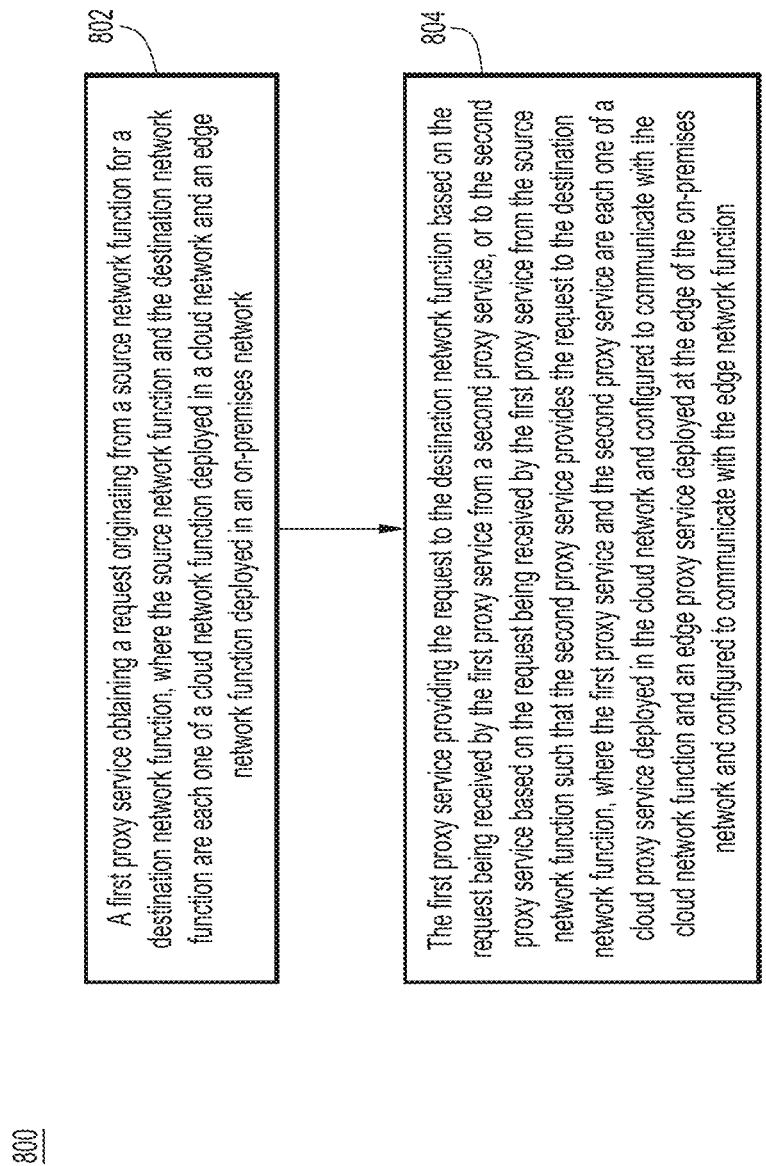
FIG. 8 is a flowchart illustrating a method of providing seamless connectivity between network functions of a connectivity providing service that is being deployed in an on-premises network and in a cloud network, according to an example embodiment.

FIG. 8 is a flowchart illustrating a method of 800 of using a pair of proxy services for providing seamless connectivity between network functions of an established connectivity providing service, according to an example embodiment.

The method 800 involves, at 802, a first proxy service obtaining a request originating from a source network function for a destination network function. The source network function and the destination network function are each one of a cloud network function deployed in a cloud network and an edge network function deployed in an on-premises network.

The method 800 further involves, at 804, the first proxy service providing the request to the destination network function based on the request being received by the first proxy service from a second proxy service or the second proxy service based on the request being received by the first proxy service from the source network function such that the second proxy service provides the request to the destination network function. The first proxy service and the second proxy service are each one of a cloud proxy service deployed in the cloud network and configured to communicate with the cloud network function and an edge proxy service deployed in the on-premises network and configured to communicate with the edge network function.

In one instance, the source network function may be the cloud network function and the destination network function may be the edge network function. The first proxy service may be the cloud proxy service and the second proxy service may be the edge proxy service. The method 800 may further involve the cloud proxy service publishing the request to a location-based queue based on a destination location of the request and extracting the request from the location-based queue in response to being polled by the edge proxy service.

In another instance, the source network function may be the edge network function and the destination network function may be the cloud network function. The first proxy service may be the cloud proxy service and the second proxy service may be the edge proxy service. The method 800 may further involve modifying the request obtained from the second proxy service by replacing location information in the request with cloud location information of the cloud proxy service.

In yet another instance, the source network function may be the edge network function and the destination network function may be the cloud network function. The first proxy service may be the edge proxy service and the second proxy service may be the cloud proxy service. The method 800 may further involve modifying the request to include a tag related to the edge network function and location information of the edge proxy service.

In yet another instance, the source network function may be the cloud network function and the destination network function may be the edge network function. The first proxy service may be the edge proxy service and the second proxy service may be the cloud proxy service. The method 800 may further involve obtaining the cloud proxy service for the request destined for the edge network function and providing the request to the edge network function.

In one or more example embodiments, the first proxy service and the second proxy service may provide a pull-pull application programing interface and the first proxy service, and the second proxy service may be configured to communicate using a hypertext transfer protocol (HTTP).

In one form, the request may be in a form of an HTTP message and may include a callback Uniform Resource Locator (URL) with location information of one or more of the source network functions, the cloud proxy service, or the edge proxy service.

According to one or more example embodiments, the source network function and the destination network function may be functions of a fifth-generation network as a service (5GaaS).

In another form, the source network function and the destination network function may be functions of a fourth-generation network as a service (4GaaS). The method 800 may further involve converting, by the first proxy service, an HTTP message to a Diameter message or the Diameter message to the HTTP message.

According to one or more example embodiments, the method 800 may involve the first proxy service communicating with one of the source network functions and the destination network function, using the Diameter message and communicating with the second proxy service using the HTTP message.

In one instance, the method 800 may further involve establishing a connectivity providing service using a plurality of network functions that include the source network function and the destination network function. The plurality of network functions may be deployed in the cloud network and in the on-premises network.

FIG. 9 is a hardware block diagram of a computing device 900 that may perform functions associated with any combination of operations in connection with the techniques depicted in FIGS. 1-8, according to various example embodiments, including, but not limited to, operations of the one or more proxy services. Further, the computing device 900 may be representative of one of the network devices that host various network functions. It should be appreciated that FIG. 9 provides only an illustration of one embodiment and does not imply any limitations with regard to the environments in which different embodiments may be implemented. Many modifications to the depicted environment may be made.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with one or more memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 916, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform various operations. The operations include obtaining, by a first proxy service, a request originating from a source network function for a destination network function. The source network function and the destination network function are each one of a cloud network function deployed in a cloud network and an edge network function deployed in an on-premises network. The operations further include the first proxy service providing the request to the destination network function based on the request being received by the first proxy service from a second proxy service or to the second proxy service based on the request being received by the first proxy service from the source network function such that the second proxy service provides the request to the destination network function. The first proxy service and the second proxy service are each one of a cloud proxy service deployed in the cloud network and configured to communicate with the cloud network function and an edge proxy service deployed in the on-premises network and configured to communicate with the edge network function.

In yet another example embodiment, one or more non-transitory computer readable storage media encoded with instructions are provided. When the media is executed by a processor, the instructions cause the processor to execute a method that includes a first proxy service obtaining a request originating from a source network function for a destination network function. The source network function and the destination network function are each one of a cloud network function deployed in a cloud network and an edge network function deployed in an on-premises network. The method further includes providing, by the first proxy service, the request to the destination network function based on the request being received by the first proxy service from a second proxy service, or the second proxy service based on the request being received by the first proxy service from the source network function such that the second proxy service provides the request to the destination network function. The first proxy service and the second proxy service are each one of a cloud proxy service deployed in the cloud network and configured to communicate with the cloud network function and an edge proxy service deployed in the on-premises network and configured to communicate with the edge network function.

In yet another example embodiment, a system is provided that includes the devices and operations explained above with reference to FIGS. 1-9.

The programs described herein (e.g., control logic 920) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 906 and/or memory elements(s) 904 can store data, software, code, instructions (e.g., processor instructions), logic, parameters, combinations thereof, and/or the like used for operations described herein. This includes the storage 906 and/or memory elements(s) 904 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a first proxy service, a request originating from a source network function for a destination network function wherein the source network function and the destination network function are each one of a cloud network function deployed in a cloud network or an edge network function deployed in an on-premises network; and
    providing, by the first proxy service, the request to:
        the destination network function based on the request being received by the first proxy service from a second proxy service, or
        the second proxy service based on the request being received by the first proxy service from the source network function such that the second proxy service provides the request to the destination network function, wherein the first proxy service and the second proxy service are each one of a cloud proxy service deployed in the cloud network and configured to communicate with the cloud network function and an edge proxy service deployed in the on-premises network and the edge proxy service configured to communicate with the edge network function,
    wherein the cloud proxy service is configured to access cloud configuration information that includes cloud location information for the cloud proxy service and the cloud network function, and
    wherein the cloud location information includes location information for a plurality of cloud network functions including a first mapping between a path prefix and a destination cloud network function tag and a second mapping between the destination cloud network function tag and a destination cloud network function host and a port.

2. The method of claim 1, wherein the source network function is the cloud network function, the destination network function is the edge network function, the first proxy service is the cloud proxy service, and the second proxy service is the edge proxy service, and further comprising:
    publishing, by the cloud proxy service, the request to a location-based queue based on a destination location of the request; and
    extracting, by the cloud proxy service, the request from the location-based queue in response to being polled by the edge proxy service.

3. The method of claim 1, wherein the source network function is the edge network function, the destination network function is the cloud network function, the first proxy service is the cloud proxy service, and the second proxy service is the edge proxy service, and further comprising:
    modifying the request obtained from the second proxy service by replacing location information in the request with the cloud location information of the cloud proxy service.

4. The method of claim 1, wherein the source network function is the edge network function, the destination network function is the cloud network function, the first proxy service is the edge proxy service, and the second proxy service is the cloud proxy service, and further comprising:
    modifying the request to include a tag related to the edge network function and location information of the edge proxy service.

5. The method of claim 1, wherein the source network function is the cloud network function, the destination network function is the edge network function, the first proxy service is the edge proxy service, and the second proxy service is the cloud proxy service, and further comprising:
    obtaining, from the cloud proxy service, the request destined for the edge network function; and
    providing the request to the edge network function.

6. The method of claim 1, wherein:
    the first proxy service and the second proxy service provide a pull-pull application programing interface, and
    the first proxy service and the second proxy service are configured to communicate using hypertext transfer protocol (HTTP).

7. The method of claim 6, wherein the request is in a form of an HTTP message and includes a callback Uniform Resource Locator (URL) with location information of one or more of the source network function, the cloud proxy service, or the edge proxy service.

8. The method of claim 6, wherein the source network function and the destination network function are functions of a fifth-generation network as a service (5GaaS).

9. The method of claim 6, wherein the source network function and the destination network function are functions of a fourth-generation network as a service (4GaaS) and further comprising:
    converting, by the first proxy service, an HTTP message to a Diameter message or the Diameter message to the HTTP message.

10. The method of claim 9, further comprising:
communicating, by the first proxy service, with one of the source network function or the destination network function, using the Diameter message; and
communicating, by the first proxy service with the second proxy service, using the HTTP message.

11. The method of claim 1, further comprising:
establishing a connectivity providing service using a plurality of network functions that include the source network function and the destination network function, wherein the plurality of network functions is deployed in the cloud network and in the on-premises network.

12. An apparatus comprising:
a memory;
a network interface configured to enable network communications; and
a processor, wherein the processor is configured to perform operations comprising:
obtaining, by a first proxy service, a request originating from a source network function for a destination network function wherein the source network function and the destination network function are each one of a cloud network function deployed in a cloud network or an edge network function deployed in an on-premises network; and
providing, by the first proxy service, the request to:
the destination network function based on the request being received by the first proxy service from a second proxy service, or
the second proxy service based on the request being received by the first proxy service from the source network function such that the second proxy service provides the request to the destination network function, wherein the first proxy service and the second proxy service are each one of a cloud proxy service deployed in the cloud network and configured to communicate with the cloud network function and an edge proxy service deployed in the on-premises network and the edge proxy service configured to communicate with the edge network function,
wherein the cloud proxy service is configured to access cloud configuration information that includes cloud location information for the cloud proxy service and the cloud network function, and
wherein the cloud location information includes location information for a plurality of cloud network functions including a first mapping between a path prefix and a destination cloud network function tag and a second mapping between the destination cloud network function tag and a destination cloud network function host and a port.

13. The apparatus of claim 12, wherein the source network function is the cloud network function, the destination network function is the edge network function, the first proxy service is the cloud proxy service, and the second proxy service is the edge proxy service, and the processor is further configured to perform:
publishing, by the cloud proxy service, the request to a location-based queue based on a destination location of the request; and
extracting, by the cloud proxy service, the request from the location-based queue in response to being polled by the edge proxy service.

14. The apparatus of claim 12, wherein the source network function is the edge network function, the destination network function is the cloud network function, the first proxy service is the cloud proxy service, and the second proxy service is the edge proxy service, and the processor is further configured to perform:
modifying the request obtained from the second proxy service by replacing location information in the request with the cloud location information of the cloud proxy service.

15. The apparatus of claim 12, wherein the source network function is the edge network function, the destination network function is the cloud network function, the first proxy service is the edge proxy service, and the second proxy service is the cloud proxy service, and the processor is further configured to perform:
modifying the request to include a tag related to the edge network function and location information of the edge proxy service.

16. The apparatus of claim 12, wherein the source network function is the cloud network function, the destination network function is the edge network function, the first proxy service is the edge proxy service, and the second proxy service is the cloud proxy service, and the processor is further configured to perform:
obtaining, from the cloud proxy service, the request destined for the edge network function; and
providing the request to the edge network function based on obtaining the cloud proxy service.

17. One or more non-transitory computer readable storage media encoded with instructions that, when executed by a processor, cause the processor to execute a method comprising:
obtaining, by a first proxy service, a request originating from a source network function for a destination network function wherein the source network function and the destination network function are each one of a cloud network function deployed in a cloud network or an edge network function deployed in an on-premises network; and
providing, by the first proxy service, the request to:
the destination network function based on the request being received by the first proxy service from a second proxy service, or
the second proxy service based on the request being received by the first proxy service from the source network function such that the second proxy service provides the request to the destination network function, wherein the first proxy service and the second proxy service are each one of a cloud proxy service deployed in the cloud network and configured to communicate with the cloud network function and an edge proxy service deployed in the on-premises network and the edge proxy service configured to communicate with the edge network function,
wherein the cloud proxy service is configured to access cloud configuration information that includes cloud location information for the cloud proxy service and the cloud network function, and
wherein the cloud location information includes location information for a plurality of cloud network functions including a first mapping between a path prefix and a destination cloud network function tag and a second mapping between the destination cloud network function tag and a destination cloud network function host and a port.

18. The one or more non-transitory computer readable storage media of claim 17, wherein the source network function is the cloud network function, the destination network function is the edge network function, the first proxy service is the cloud proxy service, and the second proxy service is the edge proxy service, and the method further comprises:
- publishing, by the cloud proxy service, the request to a location-based queue based on a destination location of the request; and
- extracting, by the cloud proxy service, the request from the location-based queue in response to being polled by the edge proxy service.

19. The one or more non-transitory computer readable storage media of claim 17, wherein the source network function is the edge network function, the destination network function is the cloud network function, the first proxy service is the cloud proxy service, and the second proxy service is the edge proxy service, and the method further comprises:
- modifying the request obtained from the second proxy service by replacing location information in the request with the cloud location information of the cloud proxy service.

20. The one or more non-transitory computer readable storage media of claim 17, wherein the source network function is the edge network function, the destination network function is the cloud network function, the first proxy service is the edge proxy service, and the second proxy service is the cloud proxy service, and the method further comprises:
- modifying the request to include a tag related to the edge network function and location information of the edge proxy service.

* * * * *